United States Patent [19]

Gates

[11] 4,148,583
[45] Apr. 10, 1979

[54] ORTHOSTEREOSCOPIC PLOTTER, APPARATUS AND METHOD OF USE

[76] Inventor: Jackson Gates, P.O. Box 145, Kylertown, Pa. 16847

[21] Appl. No.: 759,220

[22] Filed: Jan. 13, 1977

[51] Int. Cl.² .................................. G01C 11/12
[52] U.S. Cl. ............................................ 356/2
[58] Field of Search ............................ 356/2; 353/6

[56] References Cited

U.S. PATENT DOCUMENTS

| | | | |
|---|---|---|---|
| 3,554,645 | 1/1971 | Bertram | 356/2 |
| 3,752,580 | 8/1973 | Hardy | 356/2 |

OTHER PUBLICATIONS

Wolf; Paul R. *Elements of Photogrammetry*, McGraw-Hill Inc., New York, 1974, pp. 330–334.

Primary Examiner—John K. Corbin
Assistant Examiner—R. A. Rosenberger
Attorney, Agent, or Firm—J. Rodman Steele, Jr.

[57] ABSTRACT

An orthostereoscopic plotter and its method of use from which contour maps can be produced from orthostereoscopic slides or prints. The orthostereoscopic slides or prints preferably are produced by photogrammetric apparatus which utilizes a flexible platen as disclosed in my copending application, Ser. No. 557,612, now U.S. Pat. No. 4,005,932.

8 Claims, 5 Drawing Figures

ORTHOSTEREOSCOPIC PLOTTER, APPARATUS AND METHOD OF USE

BACKGROUND OF THE INVENTION

Field of the Invention

In my copending application, Ser. No. 557,612, now U.S. Pat. No. 4,005,932, photogrammetric apparatus is disclosed which utilizes a flexible platen to provide an absolute stereo image for photographic and other purposes. A multiplicity of points on the flexible platen are vertically adjustable by adjustment means to provide a three-dimensional photographic surface to enable relief distortion from aerial photographs to be eliminated in photographs which are taken of the adjusted flexible platen. If color film is used, such as Echtachrome-X, an orthostereoscopic slide or print results. The orthostereoscopic photo comprises a stereoscopic image which constitutes a geometrically accurate model having no distortion of perspective and enabling the two visually fused images to produce a unitary spatial picture.

In a regular or uncorrected anaglyphic, when projected or printed, the image is formed at approximately ½ plane of the spatial model. This is to aid in viewing so that the two separate images are separated as evenly as possible. However, with the orthostereoscopic image, there is no separated image as one image is directly over another to form one constant image therefrom. The spatial image may be adjusted to the plan of view and accordingly, the spatial image may be at its lowest or highest plane of view.

The subject invention is directed to utilizing the orthostereoscopic slide by the method and apparatus disclosed herein to provide a means for contour plotting. While the primary use of contour plotting is for map-making, the photogrammetric principles disclosed herein may also be utilized in numerous other fields to solve problems of mensuration requiring both absolute and relative determinations of size, shape, depth, height, and location of objects in their environment.

Heretofore, conventional contour plotting, techniques of which are fully disclosed in volumes 1 and 2 of the Manual of Photogrammetry published by the American Society of Photogrammetry, was carried out by utilizing standard table tracing with conventional platens and tracing apparatus. Accordingly, the prior art does not disclose a means of producing contour maps from orthostereoscopic slides, the latter which may be developed by following the teachings of my copending application, Ser. No. 557,612, now U.S. Pat. No. 4,005,932.

SUMMARY OF THE INVENTION

It is an object of the subject invention to provide a simplified process of contour plotting utilizing orthostereoscopic slides to enable the production of topographic maps.

It is yet another object of the subject invention to provide a simplified process of contour plotting in which a topographic map of two or three dimensions and having high accuracy may be achieved.

It is one more object of the subject invention to provide a simplified process of contour plotting in which errors of judgment commonly attributable to the map plotter may in large measure be eliminated.

It is but one more object of the subject invention to provide a simplified process of contour plotting whereby the speed in which said plotting is carried out may be increased without sacrificing accuracy.

Accordingly, an orthostereoscopic slide or print may be utilized with projection means and a tracing surface which together form orthostereoscopic plotting equipment that is further supplemented with a scale means so that the contour interval, which is dependent upon the distance that the projector is positioned from the tracing surface, can be determined.

As adjustments are made to raise and lower the projector, relative to the tracing surface, or to raise and lower the tracing surface relative to the projector, the spatial image from the projector is adjusted to the plan of view and the contour interval is thereby determined and plotted.

DETAILED DESCRIPTION

Figure 1:
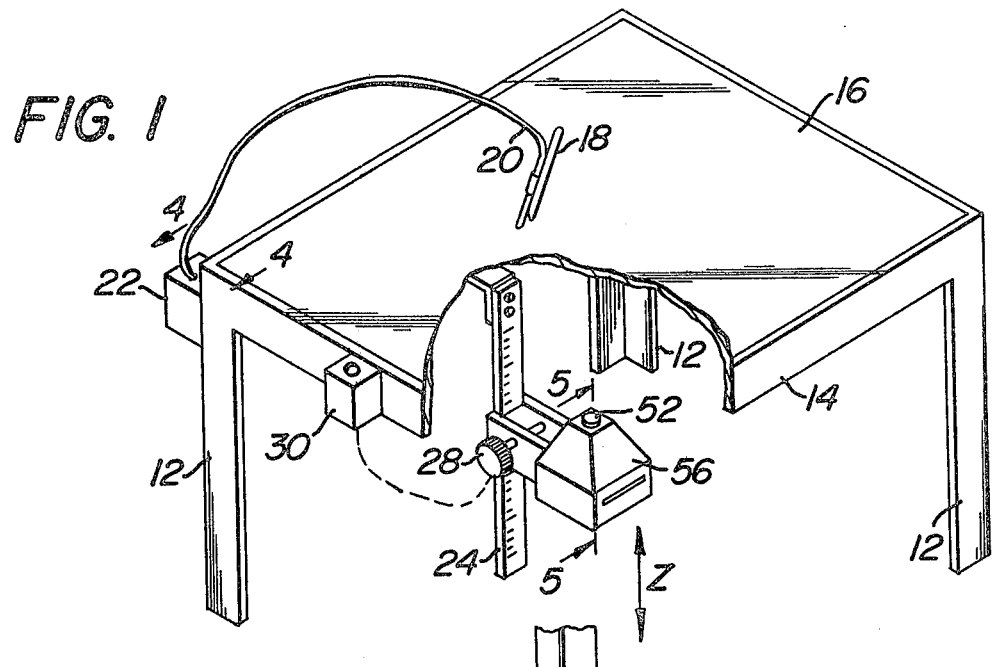
FIG. 1 is a perspective view illustrating an embodiment of an orthostereoscopic plotter which utilizes a projection means below a transparent plotting surface.

With reference to FIG. 1, orthostereoscopic plotting apparatus 10 is shown comprising vertical support members 12 and horizontal support members 14 which together provide support for transparent member 16 which is preferably a glass member.

A pencil or marking element 18 is shown which has connected thereto a light fiber 20 extending from light source 22. The light fiber 20 provides illumination to facilitate use of the marking element 18. A vertical support member 24 is secured to the orthostereoscopic apparatus 10 which supports the projector 26. As shown in FIG. 1, the projector 26 is adjustable by means of the adjustment knob 28 which controls standard adjustment means such as a ratchet and pawl combination or a rack and pinion adjustment means, neither of which need be shown. A scale index reader 30 is shown which determines the contour interval as control means 28 is adjusted.

Figure 2:
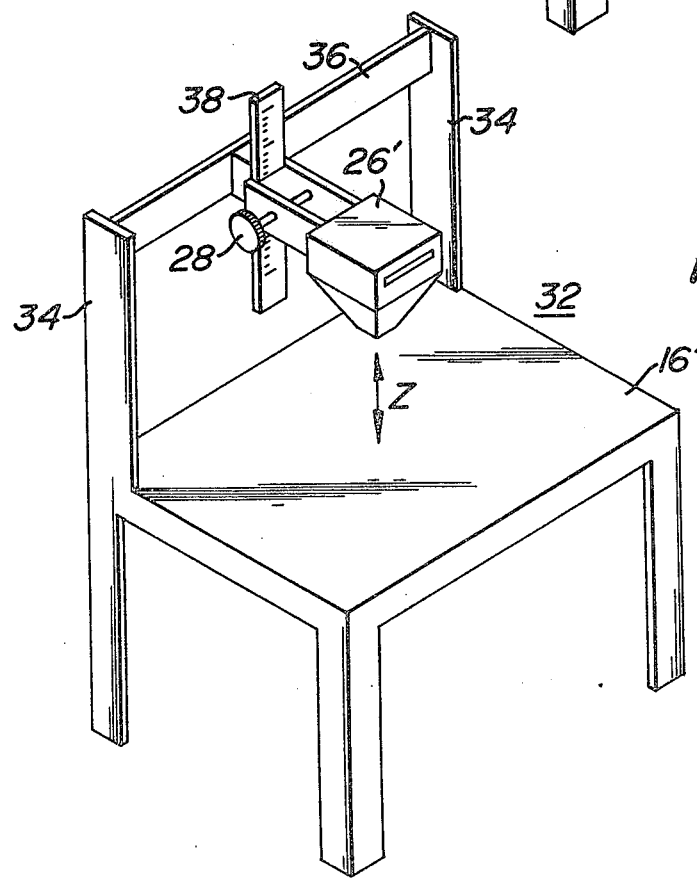
FIG. 2 is a perspective view of an orthostereoscopic plotter which has the projection means placed above the plotting surface.

With reference to FIG. 2, the orthostereoscopic plotter 32 is similar to plotter 10 of FIG. 1, however, the projector 26' is positioned above the tracing surface 16' and projects downwardly onto the surface. Upright support members 34 provide a means of supporting member 36 which in turn supports the projector mount 38.

Figure 3:
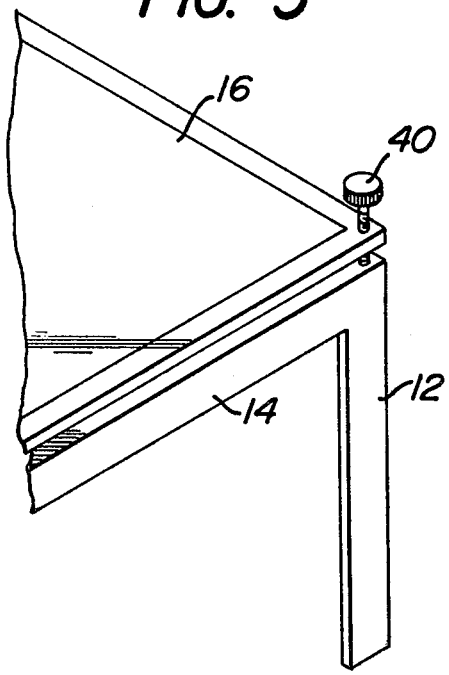
FIG. 3 is a perspective partial view of a plotting surface which is adjustable.

With reference to FIG. 3, a means of adjusting the horizontal tracing surface 16 is shown which comprises a threaded knob 40 which rests on support provided by members 12 and 14.

Figure 4:
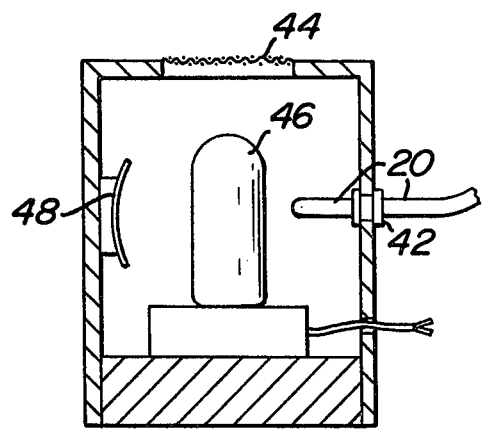
FIG. 4 is a cross-sectional view of the light source for the light fiber to be used with a tracing pencil.

With reference to FIG. 4, the light source box 22 for the light fiber 20 is disclosed with the light fiber 20 shown extending into the light source box and secured in position by clamping means 42. The box 22 is shown having an air outlet 44 below which is supported a suitable lamp 46. A concave mirror 48 may be utilized to intensify the light from lamp 46 in the direction of the light fiber 20.

Figure 5:
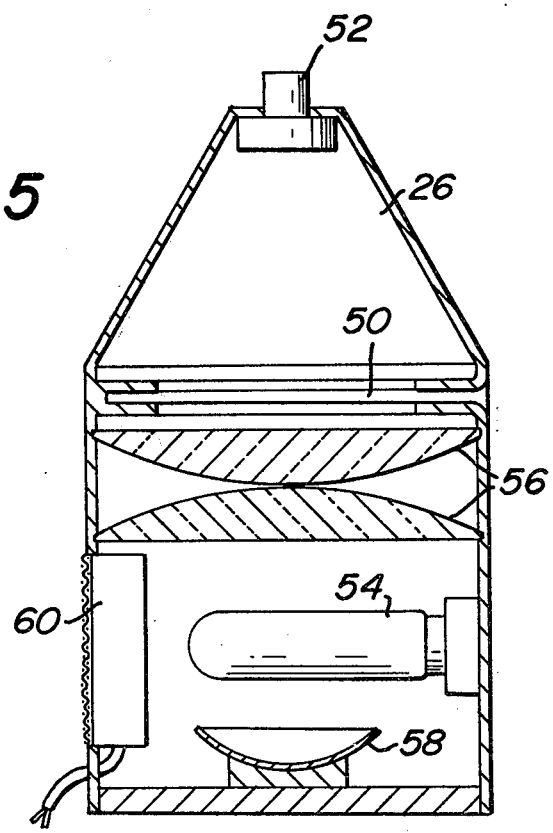
FIG. 5 is the projection means which may be used in the embodiments shown in FIGS. 1 and 2.

With reference to FIG. 5, the projector 26 which may be an ASTRO light box is shown comprising a slide supporting surface 50 which is positioned below the lens 52. A lamp or projection light 54 is positioned below a pair of condensors 56 which are secured immediately below the slide support surface 50. A concave mirror 58 is positioned below the lamp 54 and utilized to intensify the light from the lamp 54 in the direction of the lens 52. An air fan 60 is provided for circulation purposes.

The apparatus as shown in FIGS. 1 thru 5 is operated in the following manner. An orthostereoscopic slide is placed into the projector on slide receiving surface 50. The image is projected onto the surface 16 or 16'. The surface 50 and the surface 16 or 16' must be in alignment, and when this is accomplished, the spatial image formed on 16, 16' is adjusted by the motion adjusting means 28 which controls the distance between the lens 52 and the surface 16 or 16'. The distance is to be known as the Z motion. The orthostereoscopic image or spatial image may be adjusted to the plan of view with the range of adjustment extending from the lower or highest plan of view. Accordingly, as the projector is raised and lowered, the contour lines may be drawn on a tracing map and the contour interval determined by the scale index member which is keyed to the vertical motion of the projector.

From the above, it is to be appreciated that in place of the adjustable projector, an adjustable tracing surface 16 could be utilized to carry out the methods herein disclosed.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. An orthostereoscopic plotter, comprising:
    means for projecting images from an orthostereoscopic slide;
    a surface onto which said images are projected;
    means to adjust the distance between said projection means and said surface; and,
    scale means to ascertain the relative distance between said projection means and said surface, thereby to be used to ascertain the contour interval of said images projected onto said surface from said orthostereoscopic slide.

2. The orthostereoscopic plotter of claim 1 wherein said means to adjust said distance between said projection means and said surface comprises a means to vertically adjust the projection means to assume various positions relative to said surface.

3. The orthostereoscopic plotter of claim 1 wherein said means to adjust said distance between said projection means and said surface comprises a means to vertically adjust the surface to assume various positions relative to said projection means.

4. The orthostereoscopic plotter of claim 1 further including tracing means.

5. The orthostereoscopic plotter of claim 4 wherein said tracing means comprises a marking element and a light fiber secured to one another.

6. The orthostereoscopic plotter of claim 1 wherein said means of projecting is positioned above said surface and projects downwardly onto said surface.

7. The orthostereoscopic plotter of claim 1 wherein said means of projecting is positioned below said surface and projects upwardly onto said surface.

8. A method of contour plotting, comprising the steps of:
    projecting an orthostereoscopic slide onto a surface;
    tracing the image which is formed on said surface;
    adjusting the distance between said orthostereoscopic slide and said surface to cause a second image to be projected onto said surface;
    determining the contour interval between said first and said second projection;
    tracing said second image onto said surface; and,
    continuing to sequentially perform the above steps until said contour map is completed.

* * * * *